United States Patent [19]
Ezis

[11] Patent Number: 4,508,671
[45] Date of Patent: Apr. 2, 1985

[54] METHOD OF MAKING AN ANISOTROPIC SILICON NITRIDE COMPRISING OBJECT BY USE OF HIGHER DENSITY AND FULLY REACTED PREFORMS

[75] Inventor: Andre Ezis, Grosse Ile, Mich.

[73] Assignee: Ford Motor Company, Dearborn, Mich.

[21] Appl. No.: 525,498

[22] PCT Filed: Jul. 19, 1983

[86] PCT No.: PCT/US83/01113
§ 371 Date: Jul. 19, 1983
§ 102(e) Date: Jul. 19, 1983

[51] Int. Cl.³ .............................................. C04B 35/58
[52] U.S. Cl. ......................................... 264/58; 264/65; 264/66; 264/325; 264/332
[58] Field of Search ...................... 264/58, 65, 66, 332, 264/325

[56] References Cited
U.S. PATENT DOCUMENTS
3,589,880 6/1971 Clark ...................................... 264/58
4,296,065 10/1981 Ishii et al. ............................ 264/332

FOREIGN PATENT DOCUMENTS
1405171 9/1975 United Kingdom ................. 264/50

Primary Examiner—James Derrington
Attorney, Agent, or Firm—Joseph W. Malleck; Olin B. Johnson

[57] ABSTRACT

A method is disclosed of densifying a silicon nitride comprising compact having 5-17% by weight yttrium silicon oxynitride and having a density of 2.0-2.6 gm/cm³. The method comprises (a) partially sintering the compact at a temperature of 3000°-3200° F. for a period of 0.5-72 hours to form a semidense body with a density of 2.9-3.15 gm/cm³, and (b) hot pressing a stacked assembly of said bodies in the hot zone of a hot pressing cavity to form fully dense anisotropic products, each body being separated from the other within the assembly by a distance no greater than 0.03 inch, and the stacked assembly occupying substantially the entire length of the hot zone of the hot pressing cavity.

13 Claims, 1 Drawing Figure

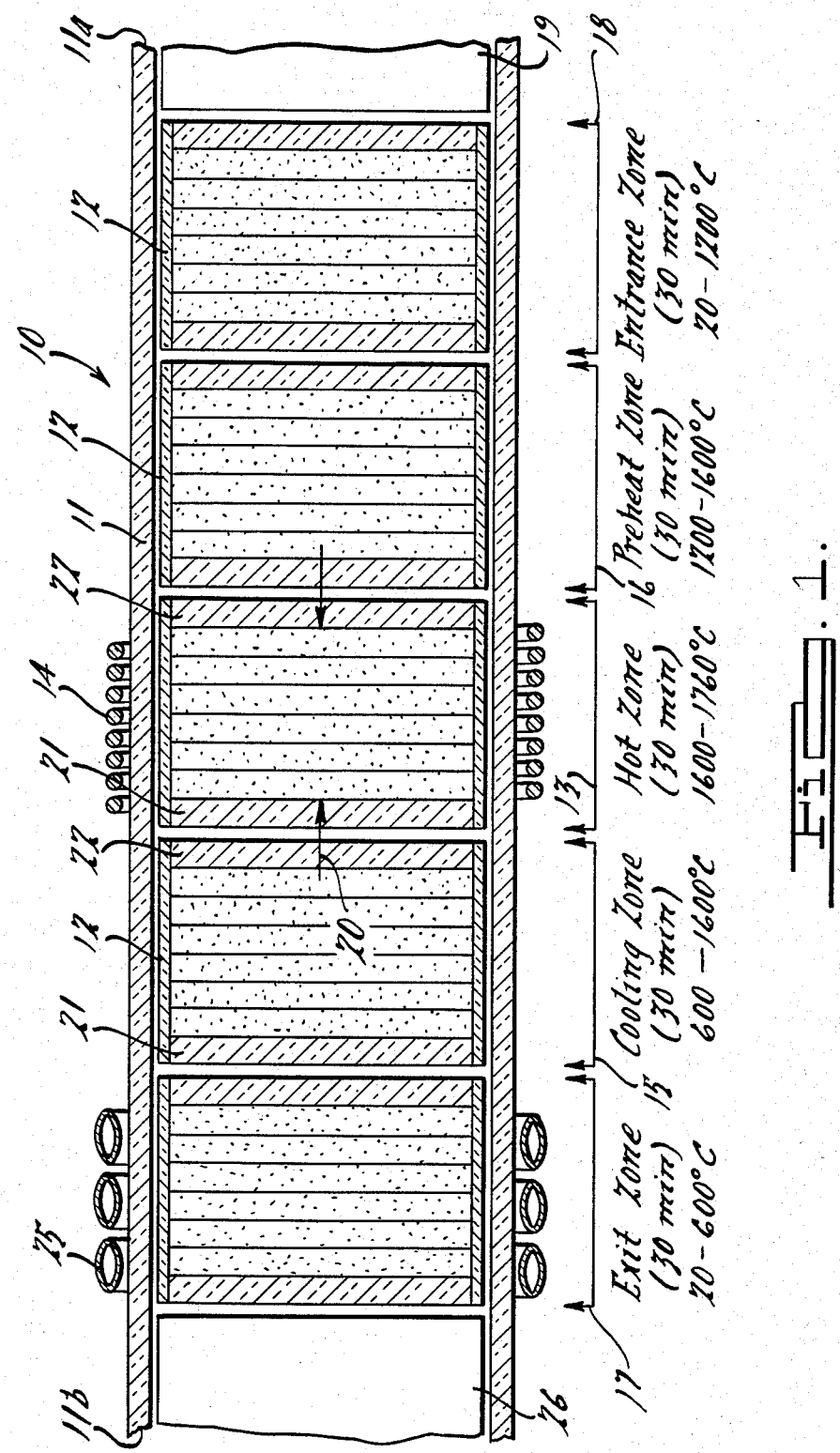

METHOD OF MAKING AN ANISOTROPIC SILICON NITRIDE COMPRISING OBJECT BY USE OF HIGHER DENSITY AND FULLY REACTED PREFORMS

BACKGROUND OF THE INVENTION AND PRIOR ART STATEMENT

The densification of silicon nitride to a substantially full density anisotropic material has usually been carried out by hot pressing of a porous silicon nitride body under sufficient pressure and temperature conditions to consolidate the body to full density (see U.S. Pat. Nos. 3,835,211; 4,179,301; 4,099,979). This mode is essentially a batch process requiring cooling of the hot pressing fixture before reloading for a subsequent hot pressing cycle.

The porous silicon nitride body has been prepared by nitriding a silicon powder in a nitrogen bearing atmosphere at sufficient temperature to form silicon nitride. The pressing additives or nitriding catalyst agents may be added to the silicon powder prior to nitriding or the pressing aids can be added to the nitrided powder following the nitriding operation after it has been reground back to a powder. Furthermore, the consolidation of the silicon nitride powder can be promoted either by cold pressing the silicon powder with its additives prior to nitriding or the nitrided powder, with subsequent additions, may be cold pressed following the nitriding operation.

Regardless of the prior art method employed, the density of the porous silicon nitride body following nitriding and cold pressing has been in the range of 2.3–2.6 gm/cm$^3$. This is considered a relatively low density range and dictates a high compression ratio and a long compression stroke to achieve full density during hot pressing.

To increase economy of processing, several porous bodies may be simultaneously hot pressed in a stack in the same cavity. This exaggerates the high compression ratio even further, requiring a still longer compression stroke. This has resulted in distortion in the densified products because of a nonuniform pressure distribution across the individual bodies. The nonuniform pressure distribution results from the existence of a temperature gradient and an accompanying viscosity gradient across the lateral width of a body. A frictional drag force (experienced between the sides of the bodies and the walls of the hot pressing assembly), in conjunction with the nonuniform pressure distribution, causes material transport within the bodies under hot pressing conditions which results in "dishing" or a severe form of distortion in the fully densified bodies.

This problem has been solved in part by my invention disclosed in U.S. application Ser. No. 444,246, in which rigid, inert spacers are inserted into the stack of low density bodies at predetermined multiples of the bodies. However, use of spacers reduces the available amount of body material that can be subjected to the effective hot zone of the hot pressing cavity. This not only results in a reduction of process efficiency, but lengthens the cycle time of hot pressing an equivalent number of bodies.

The disadvantages of following this prior art is the inefficient use of the existing hot zone and considerable wear and tear on hot pressing apparatus.

What is needed is a method in which 100% of the effective hot zone is occupied by preformed bodies during hot pressing and which bodies are densified at low pressures, shorter times, and lower compaction ratios.

SUMMARY OF THE INVENTION

The invention is a method of densifying a silicon nitride comprising object having 5–17% by weight yttrium silicon oxynitride and having a density of 2.0–2.6 gm/cm$^3$. The method comprises: (a) partially sintering the compact at a temperature of 3000°–3200° F. for a period of 0.5–72 hours to form a semidense body with a density of 2.9–3.15 gm/cm$^3$; and (b) hot pressing a stacked assembly of said bodies in the hot zone of a hot pressing cavity to form fully dense anisotropic products, each body being separated from the other within said assembly by a distance no greater than 0.03 inch, said stacked assembly occupying substantially the entire length of the hot zone of said hot pressing cavity.

Advantageously, hot pressing is carried out to sequentially hot press a train of the stacked assemblies of bodies in the hot pressing cavity. The hot pressing is desirably carried out in a tubular hot pressing cavity, the central zone of which is directly heated to constitute the hot zone and zones on either side of the hot zone experiencing a temperature gradient to permit, respectively, preheating or progressive cooling down. Each of the stacked assemblies are contained in an inert sleeve effective to slide within the cavity during the hot pressing cycle. The assemblies are indexed along the cavity providing for a predetermined time dwell within each station along the tubular cavity. Preferably, the assemblies are indexed along at least five stations in consecutive order, including an entrance zone, a preheat zone, a hot zone, a cooling zone, and an exit zone. The time dwell within each zone is 0.25–2 hours.

The hot pressing is carried out with an applied pressure of 1000–2000 psi, a temperature of 1600°–1760° C., and a compaction ratio of 1.05:1 to 1.2:1. The width to height ratio of each body within the assembly is preferably 1:3 to 1:40, and the number of bodies within each assembly is preferably 5–20. The density of the final product is 3.2–3.45 gm/cm$^3$.

The Si$_3$N$_4$ compact may be formed by forming a compact of silicon and reactive oxygen carrying agents, the latter being Y$_2$O$_3$ present in an amount of 3–19% by weight of the silicon, and 0.4–5% Al$_2$O$_3$, said oxygen carrying agents substantially fully reacting during nitriding to form a compact consisting essentially of Si$_3$N$_4$, 5–17% second phase crystallites, and an alumino silicate.

SUMMARY OF THE DRAWINGS

FIG. 1 is a central sectional elevational view of a semicontinuous hot pressing furnace useful in carrying out part of the method of this invention.

DETAILED DESCRIPTION

A preferred method for making a silicon nitride comprising object according to this invention is as follows.

1. Compacting

Preliminary to this step, a mixture of powdered silicon, SiO$_2$, and reactive oxygen carrying powder agents is prepared and milled. Reactive oxygen carrying powder agents is defined herein to mean powder ingredients that are effective to form second phase crystallites, particularly oxynitrides, when reacted with the silicon under a heated nitrogen atmosphere. The powder agents can be advantageously selected from the group consisting of $SiO_2$, $Y_2O_3$, $HfO_2$, and other rare earths. Use of these agents will improve physical characteristics and formation of the second phase crystallite. The crystallite will in turn be uniformly dispersed and substantially displace the detrimental glassy silicate phase normally formed, except for a controlled and limited amount of the latter. Use of critical amounts of $Y_2O_3$, $SiO_2$, and $Al_2O_3$ will provide additional improvements, including the formation of certain desirable oxynitride phases in the nitrided body, such as $Y_{10}Si_6O_{24}N_2$, and formation of a critically small amount of a protective amorphous glassy silicate enveloping the silicon nitride and oxynitride crystallites and in effect preventing high temperature oxidation of the crystallite during high temperature cutting tool use.

The useable range for the oxygen carrying agent is 0.4–2.3 molar percent of the mixture and 0.42–2.4 molar percent of the silicon. $Y_2O_3$ is normally used in the range of 3–19% by weight of the silicon and 3.2–15.6% by weight of the mixture. The glass forming oxide, such as $Al_2O_3$, is used in the range of 0.4–5% by weight of the silicon, 0.4–4.0% by weight of the mixture. $SiO_2$ is present usually as an oxide on the silicon powder and increased to 3.5% by weight of the silicon as a result of milling.

Oxide that is added to be reactive with the $SiO_2$ to form the protective amorphous glass can be selected from the group consisting of MgO, $CeO_2$, $Al_2O_3$, $ZrO_2$, BeO, and other rare earth oxides.

Silicon is selected to have 98% or greater purity and a starting average particle size of 2.5–3.0 microns with no particles or agglomerates exceeding 10 microns in size. The major trace metal contaminants experienced with such purity include, as a maximum: Fe-1.0%, Al-0.5%, Ca-0.02%, and Mn-0.09%. Nonmetallic contaminants include, as a maximum: carbon-0.05%, and $O_2$-less than 1.75%. Yttria is selected to have a purity of at least 99.99% with a surface area greater than 6.3 $m^2/g$ and with a crystal size of less than 0.5 microns. Alumina is selected to have a purity of at least 99.5% with an average particle size of 2–3 microns, with no particles greater than 10 microns with the crystal size of 0.3–0.5 microns.

The mixture may typically consist of 12% by weight $Y_2O_3$, 1.5% $SiO_2$, 2% by weight alumina, and the remainder essentially silicon. Such mixture is comminuted and blended by being charged into an inert milling jar along with grinding media in the form of $Si_3N_4$ cylinders of the same blend as the mixture. The mixture is milled for 48 hours at 64 rpm, then the mixture is separated from the media by use of a #10 mesh screen. The milling is preferably dry, but can be wet, with some accompanying disadvantages. The $SiO_2$ content after such milling will typically increase to 3.0–3.5% by weight of the silicon. The oxygen carrying agents should be in a reactive form with a large surface area and small crystalline size.

A measured quantity of the milled mixture is loaded into a cold pressed die arrangement and pressed at ambient conditions by use of 1400–1500 psi to form a compact of a size of about 6″ in diameter by 0.6″ thick and a density of about 1.4 $gm/cm^3$.

2. Nitriding

The compact is then heated in a nitriding atmosphere to a temperature level of about 2560° F. for a period of time to produce a silicon nitride comprising body with a density of about 2.0–2.6 $gm/cm^3$ and consisting of silicon nitride and 5–17% second phase crystallites, preferably at least 75% $Y_{10}Si_6O_{24}N_2$. The chemical reaction of the mixture takes place essentially during this heating; this heating is essentially a batch process within one or more bodies placed freely in the nitriding furnace.

It is essential that the furnace contain a nitrogen bearing atmosphere and preferably evacuated to a pressure of less than one micron initially. When the hot zone of the furnace has been heated to a temperature of about 500° F., the furnace is preferably filled with a gaseous mixture consisting of 97% by weight nitrogen, and 3% by weight hydrogen, at a pressure of about 2.7 psig. The total $O_2$ and $H_2O$ content in such gaseous mixture is less than 4 ppm. The temperature of the furnace is then increased in steps to nitriding temperatures of 2000°–2600° F. (1093°–1427° C.). Nitrogen (99.99% pure) is preferably added to the furnace when nitrogen is consumed and the pressure drops below 2.4 psig and is then brought back up to the maximum pressure of 2.7 psig.

3. Partial Sintering

The nitrided body is heated from 2560° F. to a temperature level of 3000°–3200° F., preferably in the same furnace as nitriding, at a rate of heating of about 850°–950° F./hr. The heating is carried out for a period of time of 0.5–72 hours (optimally about 24 hours) to produce a semidense body with a density of 2.9–3.15 $gm/cm^3$ and consisting essentially of the same chemistry resulting from nitriding heating. The amount of time utilized to achieve the partially sintered density will depend on the amount of $Y_{10}Si_6O_{24}N_2$ phase present and the presence of a desired amount of alumino silicate. If the maximum desired amounts of $Y_{10}Si_6O_{24}N_2$ and alumino silicates are present, the low end of the time range may be employed. With less amounts of the desired phase, higher temperatures and longer times will be necessary.

After nitriding, a typical body contains 95% of the oxynitride phase in the $Y_{10}$ form and the remaining crystallites being $Si_3N_4$, of which 85% is of the alpha type. The body is characterized by having a nitrided density of about 2.15 gm/cc and a flexural strength of less than 10,000 psi. When heated to a partial sinter, i.e., 3050° F. for 24 hours, the $Y_{10}$ portion decreased to 44% of the oxynitride phase and the alpha $Si_3N_4$ content decreased to 38%. This body is characterized by having a density of about 3.10 gm/cc and an average flexural strength of 50,000 to 60,000 psi.

This step is important because it (a) provides for use of a higher density preform than that used by the prior art, which higher density preforms enable higher pressures to be carried by the preforms in the load train of a semicontinuous hot pressing operation, and (b) provides for a low compaction ratio during hot pressing.

4. Hot Pressing

As shown in FIG. 1, a hot pressing apparatus 10 is employed having an elongated tubular graphite sleeve 11 used as a furnace conduit with one end 11$a$ receiving a supply of the compacted bodies and the other end 11$b$ permitting the exit of the bodies after being subjected to sequential stations of hot pressing. Within the long tubular graphite sleeve, the compacted discs or preforms may be stacked within an assembly sleeve 12, also of inert graphite; the assemblies are inserted as a cartridge into the entrance of the graphite sleeve 11 to slide therein. The sleeve 11 is heated directly in a central zone 13 by induction coils 14 extending essentially along only the zone 13. Zones on either side of the hot zone 13 experience a temperature gradient to permit, respectively, preheating in a zone 15, progressive cooling in zone 16, further cooling in exit zone 17 by auxiliary cooling channels 25, and some heating in entrance zone 18. The typical temperature range in each zone is shown in FIG. 1. The assemblies form a train which indexes along stations defined by the zones. The total time period the assemblies reside in the furnace sleeve is about 3½ hours with each assembly being present in each of the zones for a period of about 30 minutes (operably 0.5-2 hours). The furnace graphite sleeve is loaded by withdrawing pressure piston 19 and inserting the assemblies, or by inserting the assembly through an open slot in a side of the sleeve adjacent the entrance zone and advancing the units along by strokes of the piston. Piston 20 is preferably fixed. The piston 19 applies a pressure of 1000-2000 psi and the hot zone is heated to a temperature of 1600°-1760° C.

Prior to inserting the assembly sleeve, the bodies are preferably coated with a slurry of boron nitride and dried. The coated bodies may then be separated from each other by graphite foil in the stacking within each sleeve 12. However, it is important that the bodies be not separated by a distance of not greater than 0.03 inch so that the length 20 of the stacked bodies substantially occupies the entire length of the hot zone 13. The open ends of the stacked assembly 12 are covered by rigid graphite discs 21 and 22 which are free to slide within the assembly sleeve 12. The advantages of this invention are best realized when the number of bodies within an assembly sleeve 12 are at least five.

The compaction ratio of hot pressing is in the range of 1.05:1 to 1.2:1 and the hot pressed bodies will have a density in the range of 3.2-3.45 gm/cm$^3$.

The resulting object will be anisotropic and consist essentially of beta silicon nitride, 5-17% by weight silicon oxynitrides (predominantly YSiO$_2$N) enveloped by a silicate phase having a thickness of 2-10 angstroms and having no microporosity. The object preferably possesses a hardness of 88.5-92.0 on the 45-N scale, a density of 3.2-3.35 gm/cm$^3$, an average fracture strength of 85,000 psi or greater at 1200° C. in a 4-point bend test, and an oxidation resistance that prevents weight pickup by the object after 450 hours in air at 1000° C. Some oxynitrides of the Y$_{10}$Si$_6$O$_{24}$N$_2$ and Y$_4$Si$_2$ON$_2$ phases can be present up to 10% of the crystallite second phase.

I claim:

1. A method of densifying a silicon nitride comprising compact having 5-17% by weight yttrium silicon oxynitride and having a density of 2.0-2.6 gm/cm$^3$, comprising the steps of:
   (a) partially sintering said compact at a temperature of 3000°-3200° F. for a period of 0.5-72 hours to form a semidense body with a density of 2.9-3.15 gm/cm$^3$; and
   (b) sequentially hot pressing a stacked assembly of said bodies by sliding said bodies through the hot zone of a hot pressing cavity during hot pressing cycle at a temperature and pressure to form fully dense anistropic products, each body being separated from the other within the assembly during such sliding by a distance no greater than 0.030 inch, said stacked assembly occupying substantially the entire length of the hot zone of said hot pressing cavity.

2. The method as in claim 1, in which said hot pressing is carried out to hot press a train of said stacked assembly of bodies in said hot pressing cavity to approach continuous hot pressing, said sliding being along the axis of stacking.

3. The method as in claim 2, in which the width to height ratio of said bodies is 1:3 to 1:40 and the number of bodies within each stacked assembly is at least five and each are aligned in single file.

4. The method as in claim 1, in which said hot pressing is carried out with an applied pressure of 1000-2000 psi and a temperature of 1600°-1760° C.

5. The method as in claim 1, in which said time dwell of each body in said assembly in said hot zone of the hot pressing cavity is 0.25-2.0 hours.

6. The method as in claim 1, in which the compaction ratio of hot pressing is in the range of 1.05:1 to 1.2:1.

7. The method as in claim 1, in which the hot pressed bodies each have a density of 3.2-3.45 gm/cm$^3$.

8. The method as in claim 2, in which said hot pressing is carried out in an elongated tubular hot pressing cavity, the central zone being directly heated to form a hot zone and zones on either side of said hot zone experiencing a temperature gradient to permit, respectively, preheating or progressive cooling down, each stacked assembly of bodies being contained within an inert sleeve effective to slide within said cavity during the hot pressing cycle, said assemblies of said train being indexed along said cavity providing for a predetermined time dwell within each station along said tubular cavity.

9. The method as in claim 8, in which the assemblies are indexed along at least five stations in consecutive order, including an entrance zone, a preheat zone, a hot zone, a cooling zone, and an exit zone.

10. The method as in claim 9 in which the time dwell within each zone is 0.25-2 hours.

11. A method of making a silicon nitride comprising product, by the steps of:
   (a) forming a plurality of compacts from a mixture of powdered silicon and reactive oxygen carrying agents, the latter being effective to form upon heating at least one second phase crystallite dispersed throughout the compact, said reactive oxygen carrying agents being present in an amount to substantially fully react said silicon upon heating in nitrogen, whereby said compact will consist essentially of Si$_3$N$_4$ and 5-17% by weight second phase crystallites;
   (b) heating said compacts in a nitriding atmosphere to a temperature level for a period of time to effectively form a silicon nitride comprising body with a density of 2.0-2.6 gm/cm$^3$ and consisting essentially of Si$_3$N$_4$ and 5-17% by weight second phase crystallites;
   (c) partially sintering said bodies at a temperature of 3000°-3200° F. for a period of 0.5-72 hours to form a semidense body having a density of 2.9-3.15 gm/cm$^3$ and consisting essentially of the chemistry resulting from said heating in step (b); and
   (d) sequentially hot pressing an assembly of said partially sintered bodies, stacked in single file order, by sliding said bodies through the hot zone of a hot pressing cavity during the hot pressing cycle at a temperature and pressure to form fully dense anisotropic products, each body being separated from the other within said assembly by a distance no greater than 0.03 inch, said stacked assembly occupying substantially the entire length of said hot zone of said hot pressing cavity.

12. The method as in claim 4, in which said reactive oxygen carrying powder agents consist essentially of $Y_2O_3$ in an amount of 3–19% by weight of said silicon and said second phase crystallites are comprised of yttrium silicon oxynitrides.

13. The method as in claim 12, in which said oxygen carrying agents additionally include an oxide of aluminum effective to form a protective amorphous coating on the oxynitrides, said oxide of aluminum being present in an amount of 0.4–5% by weight of the mixture.

* * * * *